Nov. 30, 1926.
W. A. BROWN
1,609,110
CARRIER AND GAUGE FOR EXPANDING EYEGLASS FRAMES
Filed August 28, 1925
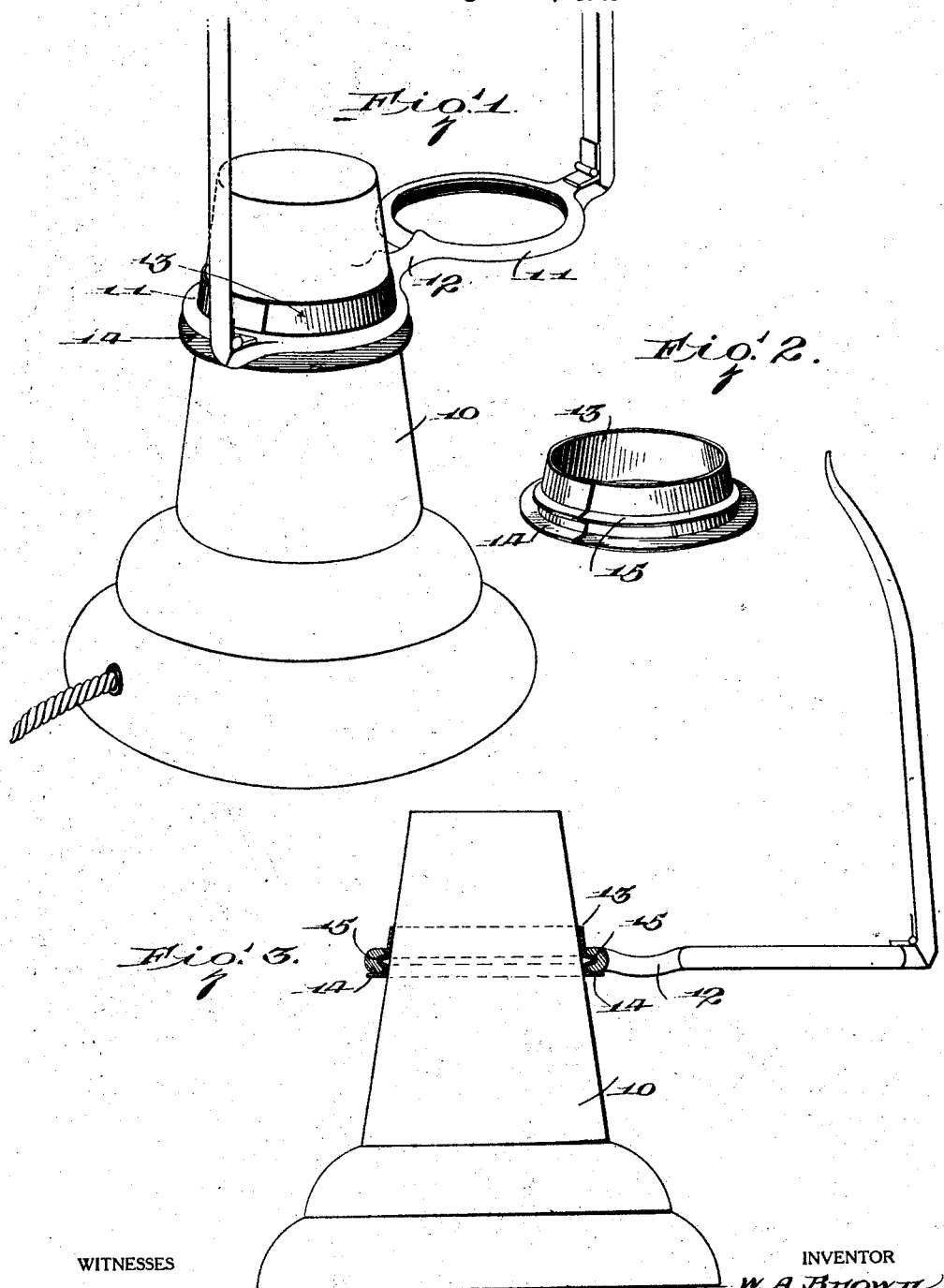

Patented Nov. 30, 1926.

1,609,110

UNITED STATES PATENT OFFICE.

WILLIAM A. BROWN, OF LINCOLN, MAINE.

CARRIER AND GAUGE FOR EXPANDING EYEGLASS FRAMES.

Application filed August 28, 1925. Serial No. 53,183.

My present invention relates generally to the expansion of the lens holding rims of eye glass frames and more especially to such expansion as is ordinarily accomplished upon an upright conical rim expander. Such expanders are heated by any suitable internal means and being smaller at the top permit of the disposition of the eye glass rims thereon until the latter becomes heated and softened to a sufficient extent where they may be forced downwardly upon and expanded on the expanding cone. In some instances, however, it has been found that the frames are marred and distorted by virtue of the direct pressure forcing the rims downwardly on the expanding cones and it is also true that some difficulty is encountered in the ordinary operation to properly gauge sizes.

My present invention proposes a carrier and gauge having for its primary object to avoid the above difficulties, to permit of ready expansion of the eye glass rims without danger of marring or distorting the same, and to form an effective, efficient gauge.

In the accompanying drawing which illustrates my present invention and forms a part of this specification:

Figure 1 is a perspective view illustrating the practical application of my invention.

Figure 2 is a detailed perspective view of my improved carrier and gauge removed, and, Figure 3 is a sectional view through one rim of an eye glass frame, showing the same in operative position on an expanding cone with my invention in use.

Referring now to these figures and particularly to Figs. 1 and 3, I have shown an expanding cone generally indicated at 10 upon which one of the rims 11 of an eye glass frame 12 is disposed in the usual position for expanding such rim. During this expansion the rim 11 after having rested in connection with the expanding cone for a sufficient length of time to become heated and softened is forced downwardly upon the tapering surface of the cone. It is obvious that during this movement considerable friction exists between the contacting surfaces of the rim and the cone, which frequently distorts the rim or otherwise mars the same.

My invention proposes the use of a combined carrier and gauge in the nature of a thin metal ring 13, one edge of which is provided with a lateral outstanding flange 14. This gauge ring is in its full circumference formed to the desired size in the first instance, corresponding to one of the many different sizes of lens, it being understood that gauge rings will be made in the first instance for the several lens sizes.

The gauge ring as proposed by my invention is split, and its ends are normally in the overlapped relation shown in Fig. 2, making it easy to slip the ring within the rim 11 of an eye glass frame which is smaller than the full circumference of the ring with the ends of the latter abutting.

With the eye glass rim on the ring 13, the latter is then pressed downwardly on the expanding cone 10. This movement of the gauge ring downwardly on the cone is substantially easier than can be accomplished with the rim directly on the surface of the cone and it is also obvious that the gauge ring takes up all friction and in this way avoids danger of marring and distorting the eye glass rim.

The ring moreover acts as an effective gauge, the gauging position of which may be easily seen as the ends of the ring 13 snap into abutting relation during the downward movement of the ring on the expanding cone.

In order to provide against relative displacement of the gauge and carrier ring and the rim being expanded thereon, the ring 13 is also provided therearound with an annular outwardly pressed rib 15 adapted to enter the lens receiving groove of the eye glass rim 11 whereby to further insure against marring and distortion of the rim.

My invention is not only simple and inexpensive but is especially effective and efficient for the purposes stated and will permit of the carrying out of the rim expanding operation with greater ease and facility as well as with uniformly better results.

While the rib 15 is not essential, I have found it highly desirable and quite an assistance in promoting ease of operation and effective results.

What I claim is:

1. A gauge for stationary rim stretching cones, consisting of a split ring in a single piece having normally overlapping ends and adapted to be expanded by downward movement on a stretching cone within a rim to be stretched until the ring ends abut one another, said ring having its total length equal to the desired inner circumference of the rim and having means engageable with a rim to prevent displacement of the rim below the gauge ring during their simultaneous stretching movement downwardly on an expanding cone.

2. A gauge for stationary rim stretching cones, consisting of a split ring in a single piece having normally overlapping ends and adapted to be expanded by downward movement on a stretching cone within a rim to be stretched until the ring ends abut one another, and a flange along the lower edge of said gauge ring to prevent displacement of a rim below the ring during simultaneous stretching movement of the rim and ring downwardly on a stretching cone.

WILLIAM A. BROWN.